(12) United States Patent
New

(10) Patent No.: US 12,369,568 B1
(45) Date of Patent: Jul. 29, 2025

(54) LIVESTOCK, WILDLIFE, AND DOMESTICATED ANIMAL AUTOMATED TEMPERATURE SCREENING SYSTEM AND PROCESS TO MONITOR HEALTH AND WELLBEING OF ANIMALS

(71) Applicant: Jarret Mason New, Wimberley, TX (US)

(72) Inventor: Jarret Mason New, Wimberley, TX (US)

( * ) Notice: Subject to any disclaimer, the term of this patent is extended or adjusted under 35 U.S.C. 154(b) by 634 days.

(21) Appl. No.: 17/591,457

(22) Filed: Feb. 2, 2022

Related U.S. Application Data

(60) Provisional application No. 63/121,715, filed on Dec. 4, 2020.

(51) Int. Cl.
| | |
|---|---|
| *A01K 29/00* | (2006.01) |
| *G01J 5/00* | (2022.01) |
| *G06T 7/00* | (2017.01) |
| *G06V 10/25* | (2022.01) |
| *G06V 20/52* | (2022.01) |
| *G06V 40/10* | (2022.01) |
| *G08B 7/06* | (2006.01) |
| *G08B 21/18* | (2006.01) |
| *H04N 7/18* | (2006.01) |

(52) U.S. Cl.
CPC ............ *A01K 29/00* (2013.01); *G01J 5/0025* (2013.01); *G06T 7/0012* (2013.01); *G06V 10/25* (2022.01); *G06V 20/52* (2022.01); *G06V 40/10* (2022.01); *G08B 7/06* (2013.01); *G08B 21/182* (2013.01); *H04N 7/183* (2013.01); *G01J 2005/0077* (2013.01); *G06T 2200/24* (2013.01); *G06T 2207/10048* (2013.01); *G06T 2207/20104* (2013.01); *G06T 2207/30232* (2013.01)

(58) Field of Classification Search
CPC ...... A01K 29/00; A01K 29/005; G06V 10/25; G06V 20/52; G06V 40/10; G01J 5/0025; G01J 2005/0077; G06T 7/0012; G06T 2200/24; G06T 2207/10048; G06T 2207/20104; G06T 2207/30232; G08B 7/06; G08B 21/182; H04N 7/183
See application file for complete search history.

(56) References Cited

U.S. PATENT DOCUMENTS

| | | | |
|---|---|---|---|
| 10,045,511 B1* | 8/2018 | Yarden | A61B 5/7405 |
| 11,100,642 B2* | 8/2021 | Sugaya | G06T 7/11 |
| 2016/0117837 A1* | 4/2016 | Baltsen | G06V 20/58 |
| | | | 382/103 |
| 2016/0314573 A1* | 10/2016 | Salisbury | G01J 5/0022 |
| 2019/0159681 A1* | 5/2019 | Sugaya | A01K 29/00 |
| 2019/0385332 A1* | 12/2019 | Yajima | G10L 15/26 |
| 2020/0296935 A1* | 9/2020 | Ashek | A01K 29/005 |
| 2020/0380678 A1* | 12/2020 | Sugaya | G06V 10/56 |

* cited by examiner

*Primary Examiner* — Randy W Gibson
(74) *Attorney, Agent, or Firm* — Plager Schack LLP; Mark H. Plager; Stephen Hallberg

(57) ABSTRACT

A livestock, wildlife, and domesticated animal automated temperature screening system and process to monitor health and wellbeing of animals including livestock, domesticated animals, and wildlife are disclosed. The livestock, wildlife, and domesticated animal automated temperature screening system and process provide a stand-alone automated temperature screening solution for the health and wellbeing of livestock, wildlife and domesticated animals.

15 Claims, 4 Drawing Sheets

LIVESTOCK, WILDLIFE, AND DOMESTICATED ANIMAL AUTOMATED TEMPERATURE SCREENING SYSTEM AND PROCESS TO MONITOR HEALTH AND WELLBEING OF ANIMALS

CLAIM OF BENEFIT TO PRIOR APPLICATION

This application claims benefit to U.S. Provisional Patent Application 63/121,715, entitled "A stand-alone automated temperature screening solution for the health and well-being of livestock, wildlife and domesticated animals," filed on Dec. 4, 2020. The U.S. Provisional Patent Application 63/121,715 is incorporated herein by reference.

BACKGROUND

Embodiments of the invention described in this specification relate generally to animal health monitoring systems, and more particularly, to a livestock, wildlife, and domesticated animal automated temperature screening system and process to monitor health and wellbeing of animals including livestock, domesticated animals, and wildlife.

Monitoring the health and wellbeing of livestock animals, domesticated animals, and wild animals (or wildlife) has always involved some element of human labor.

Existing animal health monitoring mechanisms include the manual use of thermometers, which requires human interaction and labor to accurately assess animals. Furthermore, the use of thermometers typically requires some sort of restraint or sedation to monitor the health and temperature of the animals.

However, monitoring the health and wellbeing of animals cannot always be accomplished through human involvement. Furthermore, the requirement of human involvement in monitoring the health and wellbeing of animals puts a constraint in place which limits the ability to routinely monitor animal health and wellbeing.

Therefore, what is needed is an automated solution that is free of animal contact but which can detect animal temperatures to analyze the health and wellbeing of animals as well as create a more accurate reading of animal temperature than that of typical thermal camera readings and which detects the animals in question by way of a bounding box algorithm to filter out any other false readings to accurately access the health and wellbeing of the animal.

BRIEF DESCRIPTION

A novel livestock, wildlife, and domesticated animal automated temperature screening system and process to monitor health and wellbeing of animals including livestock, domesticated animals, and wildlife are disclosed. In some embodiments, the livestock, wildlife, and domesticated animal automated temperature screening system utilizes a thermal imaging system and a steady state algorithm to autonomously read animal temperature data captured as thermal image data and provide animal temperature readings or adjusted animal temperature readings that accurately reflect actual animal temperature to gauge animal health and wellbeing. In this way, the livestock, wildlife, and domesticated animal automated temperature screening system is a stand-alone imaging solution the reduces or eliminates human labor, human involvement, or any other human element to monitor the health and wellbeing of animals. As such, the livestock, wildlife, and domesticated animal automated temperature screening system reduces or eliminates human involvement or any other human element. Furthermore, the livestock, wildlife, and domesticated animal automated temperature screening system and process allows the end user to have an automated health and temperature screening solution via pinpointing specific hot spots and detecting and identifying the specific body part/anatomy of the animal causing the heat which corresponds to health issues.

In some embodiments, the livestock, wildlife, and domesticated animal automated temperature screening system comprises a thermal imaging system, a processing unit of a computing device, and a firmware software system that is installed on the computing device and runs on the processing unit. In some embodiments, the firmware software system comprises a steady state program that implements the steady state algorithm and is configured to accurately read animal temperature by detecting and excluding anomalies and false readings from the thermal imaging data captured and provided by the thermal imaging system and to provide adjusted animal temperature readings that accurately gauge animal health and wellbeing. In some embodiments, the firmware software system comprises a bounding box control that is configured to automatically identify each animal in need of an accurate assessment of temperature and exclude any other objects, animals, or other elements (extraneous elements) that could appear as false readings. In some embodiments, the firmware software system comprises a pinpoint accuracy control that is configured to detect and identify elevated temperature in precise areas and parts of an animal.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
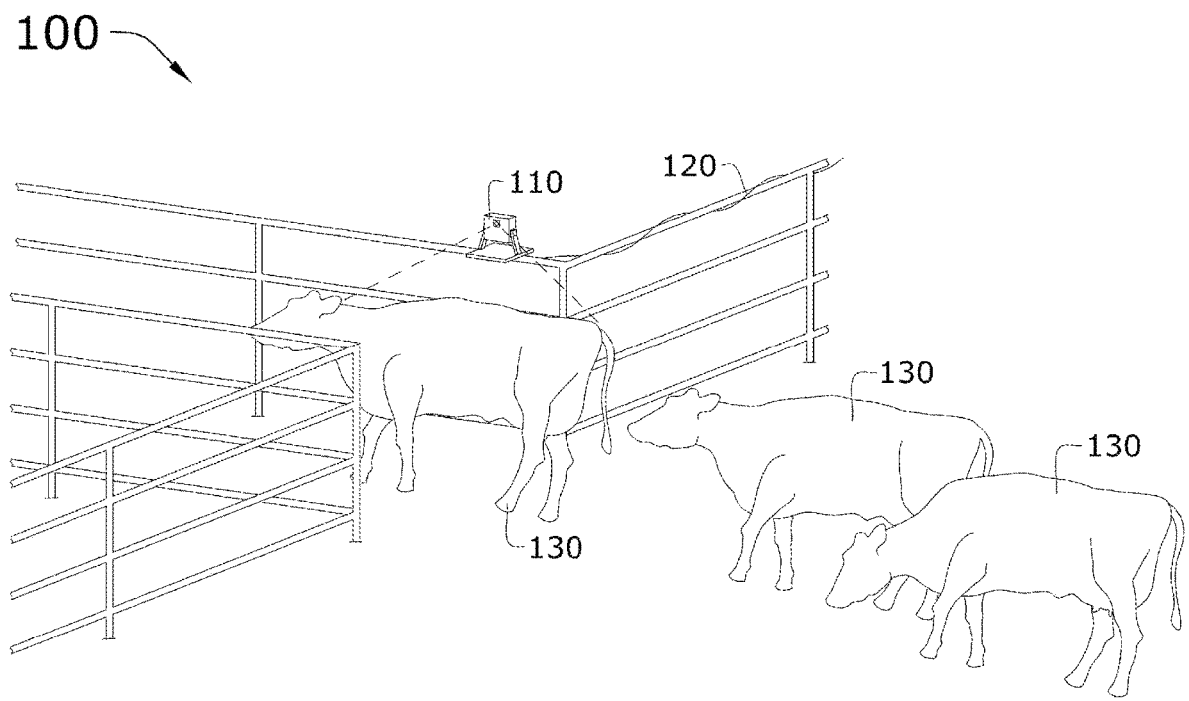
FIG. 1 conceptually illustrates a thermal camera while using a livestock, wildlife, and domesticated animal automated temperature screening system to monitor health and wellbeing of animals in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments provide a livestock, wildlife, and domesticated animal automated temperature screening system and process to monitor health and wellbeing of animals including livestock, domesticated animals, and wildlife are disclosed. In some embodiments, the livestock, wildlife, and domesticated animal automated temperature screening system utilizes a thermal imaging system and a steady state algorithm to autonomously read animal temperature data captured as thermal image data and provide animal temperature readings or adjusted animal temperature readings that accurately reflect actual animal temperature to gauge animal health and wellbeing. In this way, the livestock, wildlife, and domesticated animal automated temperature screening system is a stand-alone imaging solution the reduces or eliminates human labor, human involvement, or any other human element to monitor the health and wellbeing of animals. The livestock, wildlife, and domesticated animal automated temperature screening system and process of the present disclosure reduces or eliminates human involvement or any other human element. Furthermore, the livestock, wildlife, and domesticated animal automated temperature screening system and process allows the end user to have an automated health and temperature screening solution via pinpointing specific hot spots and detecting and identifying the specific body part/anatomy of the animal causing the heat which corresponds to health issues.

In some embodiments, the livestock, wildlife, and domesticated animal automated temperature screening system comprises a thermal imaging system, a processing unit of a computing device, and a firmware software system that is installed on the computing device and runs on the processing unit. In some embodiments, the thermal imaging system comprises a thermal camera. In some embodiments, the thermal imaging system comprises an infrared (IR) sensor and a digital camera. In some embodiments, the processing unit of the computing device comprises a main control unit (MCU) and execution unit, a plurality of buffers, a plurality of registers, and processing unit memory (cache, DRAM, etc.).

In some embodiments, the firmware software system comprises a steady state program that implements the steady state algorithm and is configured to accurately read animal temperature by detecting and excluding anomalies and false readings from the thermal imaging data captured and provided by the thermal imaging system and to provide adjusted animal temperature readings that accurately gauge animal health and wellbeing. In some embodiments, the steady state program is able to detect and exclude anomalies and false readings by averaging the state of animals and surrounding factors to obtain the most accurate temperature reading and exclude any false readings.

In some embodiments, the firmware software system comprises a bounding box control that is configured to automatically identify each animal in need of an accurate assessment of temperature and exclude any other objects, animals, or other elements (extraneous elements) that could appear as false readings. In other words, the bounding box control is configured to identify and hone in on only the animal needing an accurate assessment of temperature. Also, the bounding box control identifies the animal(s) in need or temperature assessment and excludes extraneous elements autonomously (without human involvement) when the firmware software system is running on the processing unit of the computing device. In some embodiments, the bounding box control is linked to a bounding box tool that is provided through the GUI interface and optionally enables user interaction.

In some embodiments, the firmware software system comprises a pinpoint accuracy control that is configured to detect and identify elevated temperature in precise areas and parts of an animal. In some embodiments, the pinpoint accuracy control performs the detection and identification of elevated temperature in precises areas and parts of the animal autonomously (without human involvement) when the firmware software system is running on the processing unit of the computing device. In some embodiments, the pinpoint accuracy control is linked to a cursor pinpointing tool that is provided through the GUI interface and optionally allows a user to direct the pinpoint accuracy control to focus on a particular user-directed area of the animal.

In some embodiments, the firmware software system comprises an alert notification system that is configured to automatically generate and send a communication to a user that notifies the user of specific animal(s) or object(s) with temperature exceeding a threshold numeric value for temperature. In some embodiments, the livestock, wildlife, and domesticated animal automated temperature screening system comprises artificial intelligence (AI) and machine learning (ML) modules. In some embodiments, the AI and ML modules operate in connection with the firmware software system to increase animal/organism detection and identification.

As stated above, livestock and wildlife have always had a human labor element in monitoring their health and wellbeing. Embodiments of the livestock, wildlife, and domesticated animal automated temperature screening system and process to monitor health and wellbeing of animals described in this specification solve such problems by autonomously screening animals, including livestock animals, domesticated animals, wildlife, etc., for elevated body temperatures, by way of a stand-alone automated imaging and image processing system that obviates the need for human involvement in the labor and work of monitoring but which provides automatic non-contact screening of animals with alerts for animals whose temperatures reach or exceed a specified threshold temperature. In some embodiments, the livestock, wildlife, and domesticated animal automated temperature screening system and process utilizes thermal imaging cameras and/or IR sensors with digital cameras to accurately and efficiently access and read an animal's body temperature through a steady state algorithm to exclude false readings and anomalies of heat, a bounding box to exclude any other surrounding heat sources which may cause a false reading, an adjustable threshold to accurately access the animal's healthy temperature, and an animal health and wellbeing detection and pinpoint identification software system to accurately pinpoint the location at which the elevated temperature is present on the animal and pinpoint the exact animal needing screening. The livestock, wildlife, and domesticated animal automated temperature screening system and process of the present disclosure can also be switched over to pinpoint herds of animals at one time screening multiple animals at once to determine and identify which animals have an elevated temperatures or need to be further examined for health issues.

Embodiments of the livestock, wildlife, and domesticated animal automated temperature screening system and process to monitor health and wellbeing of animals described in this specification differ from and improve upon currently existing options. In particular, there are no automated systems or other mechanisms in the area of animal health monitoring which provide contact-free screening of livestock or domesticated animal health and wellbeing or wildlife health and wellbeing. In addition to working as a thermal imaging system, the livestock, wildlife, and domesticated animal automated temperature screening system and process of the present disclosure provides a bounding box tool and a cursor pinpoint tool by way of the animal health and wellbeing detection and pinpoint identification software system (which includes a firmware software module that directly connects to a graphical user interface on a computing device or mobile device screen to provide a user accessible solution for interacting with the system and viewing animal temperatures in aggregate or in close-up pinpoint view) to highlight each animal for a more accurate reading of temperature of that animal. Furthermore, the animal health and wellbeing detection and pinpoint identification software system may include artificial intelligence (AI) and machine learning (ML) modules that operate on raw incoming data in connection with the steady state program, the bounding box control, and the pinpoint accuracy control of the firmware software to identify animals of interest as distinct elements and ignore extraneous elements in the sensor data captured and processed via the firmware software before, optionally, rendering and visually outputting the resulting data and temperatures of the animals scanned by the thermal camera.

In addition, embodiments of the livestock, wildlife, and domesticated animal automated temperature screening system and process to monitor health and wellbeing of animals improve upon the currently existing options for monitoring animal temperature. In particular, the existing options primarily involve a human element in which the temperature of an animal is obtained via thermometer. A thermometer generally requires human labor and involvement in the process. By contrast, the livestock, wildlife, and domesticated animal automated temperature screening system and process to monitor health and wellbeing of animals described in this specification eliminates the requirement of human involvement by automating temperature reading via thermal camera and feeding results to computing devices for processing. Outside of any optional human review of the thermal imaging, the livestock, wildlife, and domesticated animal automated temperature screening system is fully automated. Additionally, the use of thermometers has other drawbacks. For instance, the use of thermometers causes subject animals unnecessary stress because thermometers are, by nature, contact devices and/or invasive. Specifically, thermometers used for animals are typically rectal thermometers. The use of rectal thermometers in animals usually requires sedation or restraints of the animal to accurately assess an animal's health. Thus, using a thermometer to obtain the temperature of an animal potentially involves the labor of multiple humans and is intrusive enough to cause undue stress to the animal (where sedation would generate a stress response before and after the sedation affect and the thermometer would generate a stress outcome by its very invasive nature).

Also, thermal imaging systems without software can be used to assess animal health but without artificial intelligence (AI) software modules and systems, machine learning (ML) software modules and systems, and software (applications and/or firmware) adjusting the threshold, and creating a steady state and bounding box are inaccurate and gain false readings. Thermal imaging cameras or infrared (IR) sensors could potentially be used without AI software modules or systems. But without AI software modules or systems, the thermal imaging cameras or IR sensors still require a human element to actively monitor the system. Furthermore, without AI software modules or systems, the existing thermal imaging cameras or IR sensors are not automated and do not yield accurate readings or accurately pinpoint and detect which areas of an animal (or among a herd of animals) need further investigation. However, the livestock, wildlife, and domesticated animal automated temperature screening system and process of the present disclosure takes away the human element from the use of thermometers and the stress caused to animals by using thermometers which is typically the intrusive and invasive animal body-contacting rectal thermometer. Not only does this normally require sedation or restraints to accurately assess an animal's health through temperature, but also unduly stresses the animal. The livestock, wildlife, and domesticated animal automated temperature screening system and process of the present disclosure allows the end user to have an automated health and temperature screening solution via pinpointing specific hot spots and detecting and identifying the specific body part/anatomy of the animal causing the heat consistent with health issues. The livestock, wildlife, and domesticated animal automated temperature screening system and process also allows thermal imaging cameras and or IR sensors with digital cameras to accurately and efficiently obtain an animal's body temperature through a steady state algorithm to exclude false readings and anomalies of heat, a bounding box to exclude any other surrounding heat sources which may cause a false reading, an adjustable threshold to accurately access the animals healthy temperature, and a detection and identification software to accurately pinpoint where the elevated temperature is coming from on the animal and pinpoint the exact animal needing screening. The livestock, wildlife, and domesticated animal automated temperature screening system and process can also be switched over to pinpoint herds of animals at one time screening multiple animals at once to access which animals have an elevated temperature or need further health examination.

The livestock, wildlife, and domesticated animal automated temperature screening system of the present disclosure may be comprised of the following elements.

1. Thermal imaging system (e.g., thermal camera, digital camera/IR sensors).

2. Wired or wireless data transmission hardware mechanism to transfer data from the thermal camera to the processing unit of the computing device. Power may also be provided through wiring to the camera and/or to the computing device. Optionally, both or either of the camera and the computing device may run on battery power. For wired transmission of data, USB cables connected between the camera and computing device, twisted pair or Ethernet cables (e.g., CAT-5, CAT-6, CAT-7, etc.) configured to transmit data from camera to computing device via common protocols, such as TCIP/IP, HTMl, etc. For wireless transmission, Bluetooth®, WiFi®, or any other manner of transferring data wirelessly.

3. Computing device with a processing unit. The computing device may also have an integrated display screen (such as an integrated display screen of a laptop computer, a tablet computer, etc.) or be communicatively connected to a display screen or monitor, such as an externally connected LCD display or OLED display. The computing device and processing unit may also operate free of a display screen or monitor. When no display is utilized, the processing unit of the computing device runs the firmware software solution only. By contrast, when a display screen is connected or integrated with the computing device, the processing unit runs the firmware software solution in connection with a GUI interface that optionally provides a user interface for interaction and realtime or post-processing review of thermal imaging data related to livestock, wildlife, or other living organisms. In some embodiments, the processing unit is included as part of a custom computing device processing unit that is designed specifically for reading thermal imaging data to monitor the health and wellbeing of animals when running the firmware software (either/both of firmware and GUI interface).

4. Software system (either/both of firmware software and GUI interface). Temperature threshold and other settings are adjustable through the software to provide more accurate readings. Video playback tools are optionally provided in the GUI interface software for post-processing review by a user. Other tools are provided in the GUI interface to distinguish extraneous elements from focal elements (i.e., animals being monitored) and to allow precision control. Some of the other tools include a bounding box tool and a cursor pinpointing tool.

5. Steady state algorithm which is implemented as a runtime firmware software process (also referred to as "steady state firmware software process", "steady state program", or "steady state software"). The steady state firmware software process increases the accuracy of readings by automatically detecting and excluding anomalies and/or false readings.

6. Firmware software bounding box control that is configured to automatically identify the animal(s) needing an accurate assessment of temperature and exclude any other objects, animals, or other elements which may give false readings. In other words, the bounding box control is configured to identify and hone in on only the animal needing an accurate assessment of temperature. As such, the bounding box control is helpful in distinguishing animals with possible sickness or injury from other animals in a herd, a pack, or any other scenario in which multiple animals are passing through an area captured by the thermal imaging system. Furthermore, the bounding box control operates autonomously. As such, no human interaction is required to operate the bounding box control. However, the bounding box control is linked to the bounding box tool of the GUI interface for optional user interaction.

7. Firmware software pinpoint accuracy control that is configured to detect and identify precise areas and parts of the animal (identified by the bounding box control) in which elevated temperature is detected. In this way, the pinpoint accuracy control identifies specific areas of a concern for the animal, thereby allowing a user to further review and access underlying health issues. Also, the pinpoint accuracy control performs the detection and identification of precises areas and parts with elevated temperature autonomously. However, the pinpoint accuracy control is also linked to a cursor pinpointing tool provided in the GUI interface, thereby allowing a user to optionally interact with the cursor pinpointing tool to direct the pinpoint accuracy control to focus on a particular user-directed area of the animal.

8. Firmware software alert notification system that is configured to automatically generate and send a communication to a user that notifies the user of specific animal(s) or object(s) with temperature exceeding a threshold numeric value for temperature. In some embodiments, the alert notification system is configurable for the user to specify a form of communication. Examples of the form of communication generated by the alert notification system include, without limitation, an email message, an email message with an image attachment, a text message (SMS), a text message with image attachment (MMS), an automated voice message, or another digital communication form. When an image is attached, the image may be an image of a heat map of the animal or a digital image of the animal, with text information supplementing the image.

9. Data storage for persistent storage of thermal imaging data and resulting adjusted data after the cleansing, processing, and analyzing phases are completed.

10. Artificial intelligence (AI) and machine learning (ML) modules that operate in connection with the firmware software to increase animal/organism detection and identification. Since the AI and ML modules modify detection to enable specific animal or organism identification, the user is able to configure and set multiple different threshold values for different animals, livestock, or wildlife, as may be captured via the thermal camera.

As the several aspects described above suggest, the firmware software by itself is configured to provide an autonomous solution that decreases or eliminates human interaction, labor, or any other human involvement element to allow the end user to simply receive alerts for any specified animal or object above specified temperature. When the firmware software and GUI interface software operate in tandem, the human involvement element is also reduced or eliminated, while providing an optional user interactive experience when or if the end user wishes to actively monitor animal health or wellbeing determined by the livestock, wildlife, and domesticated animal automated temperature screening system.

In some embodiments, the livestock, wildlife, and domesticated animal automated temperature screening system generally works by way of the thermal camera capturing the raw data, which is transferred in a format (e.g., HTMI, HTML, etc.) over data cable (e.g., USB, Ethernet, twisted pair, etc.) or wirelessly (e.g., WiFi, Bluetooth, etc.) to the processing unit of the computing device. The processing unit then utilizes the software/firmware to analyze the data for the desired outcome of an automated temperature reading to analyze the health of animals and supply an alert based on factors of each animal and or record results or data for further processing or later viewing.

In some embodiments, the livestock, wildlife, and domesticated animal automated temperature screening system performs operations during different phases. The different phases include, without limitation, a data cleansing phase, a processing phase, and an analyzing phase. Other operations perform adjustment of the threshold due to exterior factors. The livestock, wildlife, and domesticated animal automated temperature screening system supplies the bounding box as an implicit (automatic when no display screen) or explicit (GUI interface and user interactive) tool that is configured to filter out external elements captured by the thermal camera and, accordingly, to hone in on each and only each animal, living organism, or object of concern (or of focus) as warranted by the data as reviewed and analyzed. Thus, by excluding any extraneous items or focal points of no concern from the data captured by the thermal camera, the livestock, wildlife, and domesticated animal automated temperature screening system is able to intelligently and autonomously focus on the subject of interest, which is an animal or several animals. Furthermore, the steady state firmware software process is used by the livestock, wildlife, and domesticated animal automated temperature screening system to find a steady state and exclude any anomalies in temperature. This is useful, for example, in situations where the thermal camera is capturing data from a herd of livestock or group of wildlife animals, but needs a way to focus only on problematic readings (abnormal or exceeding thresholds) associated with particular animals. Then the results are provided through autonomous alerts if an animal or object is above the adjusted threshold. In some embodiments, the livestock, wildlife, and domesticated animal automated temperature screening system is configured to automatically transmit such alerts to one or more users. Alerts may be transmitted in any digital manner including, without limitation, email, text message, automated voice message, etc. In some embodiments, the livestock, wildlife, and domesticated animal automated temperature screening system also provides the results prior to or after to the autonomous alert for realtime processing or post-processing to pinpoint and identify specific regions or parts of the living organism or object identified as beyond the threshold and thereafter specify areas which may need further medical examination outside of only a whole object-body elevated temperature alert. For example, elevated heat level detected on a leg of an animal may indicate inflammation consistent with injury, and therefore, should be looked at closer.

In some embodiments, the livestock, wildlife, and domesticated animal automated temperature screening system works in a sequence during which the software first detects each particular animal, living organism, or specified object via bounding box control and then the software (second) takes the temperature of that animal, living organism, or specified object. If the animal, living organism, or specified object is above a previously adjusted threshold numeric value, the software starts the pinpointing control operation which shows focal areas of the animal in order to pinpoint potential sickness or injury in specific areas or parts of the animal, living organism, or specified object in realtime or as recorded through a post-processing operation when or if the results are recorded for later viewing. The steady state logic works by averaging the state of animals and surrounding factors to gain the most accurate temperature reading and exclude any false readings. The AI and ML modules operate to increase animal/organism detection and identification, thereby allowing the livestock, wildlife, and domesticated animal automated temperature screening system to set multiple different threshold values for different animals, livestock, or wildlife, as may be captured via the thermal camera.

To make the livestock, wildlife, and domesticated animal automated temperature screening system and process of the present disclosure, a person may provide a thermal imaging system, such as a thermal camera, a thermal imaging module with a lens, or a digital camera with a thermal sensor (such as an infrared (IR) sensor). The person may also connect the thermal imaging system to a developmental board or printed circuit board (PCB), with a main control unit and associated modules and communication devices, as well as encapsulating the components of the thermal imaging system in a case or housing with the lends or camera protruding to an outward view. Instead of building or manufacturing a custom thermal imaging system, the person may provide an off-the-shelf commercially available thermal camera or a combination of a digital camera and one or more IR sensors. Then the person may build or manufacture a custom processing unit of a computing device or provide a commercially available processing unit. The person may optionally connect the processing unit to a display screen or other visual output device (e.g., a touchscreen, a projector, etc.). When no display is connected or included, the person may pre-program the processing unit to function by interaction of hardware buttons which when depressed trigger certain specified actions as programmed. Similarly, the processing unit itself can be communicably connected to another computing device or mobile device for operative input. The computing device and processing unit may be a complete singular unit commercially available for purchase, or separate units. In either case, the computing device and processing unit both connect to the thermal imaging system (and its internal PCB) by wired or wireless connection. The software/firmware may be installed onto the development board (PCB) of thermal imaging system or installed on the computing device to be run on the processing unit for runtime operation of system. The software itself would be built with logic to create a steady state to detect an elevated animal temperature accurately as well as a bounding box to detect the animal in question and exclude any false readings, further enhance by pinpoint accuracy control, AI/ML modules, external or internal persistent storage device(s), connection to external networks (Internet, cellular network, etc.) for communication of alert notifications when an animal is detected above the adjusted temperature threshold, etc.

In some embodiments, the computing device or custom device with the processing unit are central components of the system. In some embodiments, infrared (IR) sensors (or IR readers, IR devices, etc.) that detect infrared light could be installed that are configured to read the heat signatures of animals. In some embodiments, the IR readers can be utilized in combination with the thermal camera to enhance the accuracy of the data captured. In some embodiments, a digital camera (video camera) can be added to enhance the efficiency of the detection of each animal in question to exclude any false readings.

To use the livestock, wildlife, and domesticated animal automated temperature screening system and process of the present disclosure, a person would deploy the thermal imaging system (thermal camera and/or IR sensors) at a location proximate to the subject animals whose health and wellbeing are to be monitored. For instance, near a sleeping area for livestock, or a common path to a water source for wildlife, etc. After deployment, the livestock, wildlife, and domesticated animal automated temperature screening system is turned on. The thermal camera operates to capture data and the processing unit then processes the data autonomously. The data can also be recorded for post-processing by the processing unit and software. When used in a realtime mode, the livestock, wildlife, and domesticated animal automated temperature screening system automatically alerts the user of any animals to be further checked out due to elevated body temperature as detected by the thermal camera/processing unit, or elevated temperature areas of the body of the animal (in connection with the bounding box and pinpointing tools). When used in post-processing mode, the thermal camera captures the data, records the data for post-processing, and then provides the data to the processing unit later, such as when the processing unit is communicably connected to the thermal camera. Similarly, a memory card could be the destination for persistent storage of the captured data by the thermal camera. Then, the memory card can be removed from the thermal camera when recording is completed and installed in the computing device of the processing unit later for post-processing. For example, the thermal camera is at a remote location and a human takes the memory card from the thermal camera to a different location of the processing unit for post-processing analysis and cleansing of the data to accurately assess the health and wellbeing of the animals captured in the data.

By way of example, FIG. 1 conceptually illustrates a thermal camera in use to capture data in connection with a livestock, wildlife, and domesticated animal automated temperature screening system to monitor health and wellbeing of animals 100. As shown in this figure, a thermal camera 110 is mounted on a fence or guard rail proximate to a path through which livestock animals 130 pass. In this figure, the thermal camera 110 is communicably connected to a processing unit (not shown) via a wired connection as shown by data cabling 120.

Figure 2:
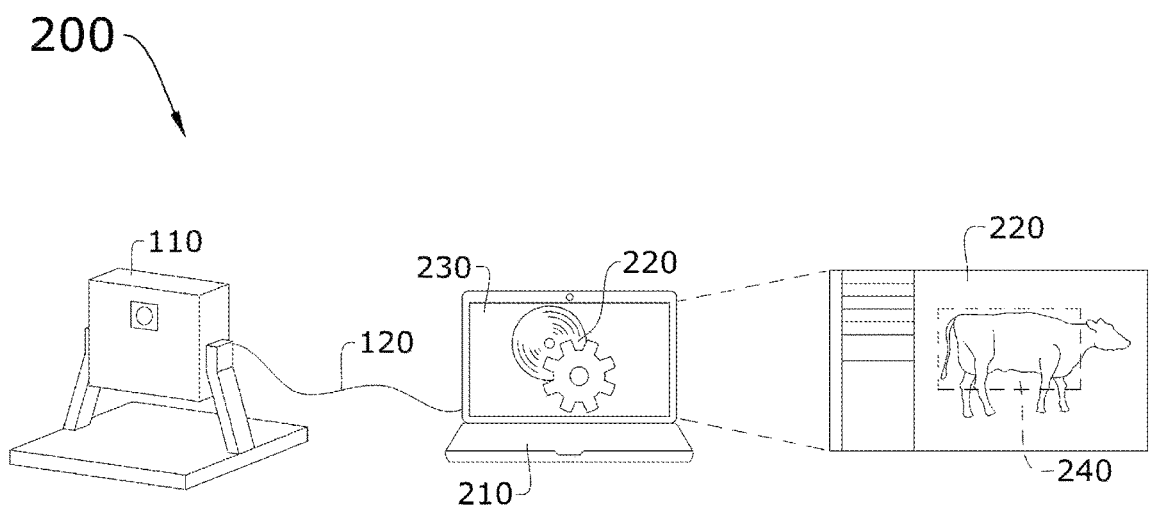
FIG. 2 conceptually illustrates a schematic diagram of a livestock, wildlife, and domesticated animal automated temperature screening system in some embodiments.

Turning to another example, FIG. 2 conceptually illustrates a schematic diagram of a livestock, wildlife, and domesticated animal automated temperature screening system 200. Specifically, the schematic diagram of a livestock, wildlife, and domesticated animal automated temperature screening system 200 shown in the figure includes a thermal camera 110, data cabling 120, a processing unit 210, a firmware/software system 220 that runs on the processing unit 210, a display screen 230, and a bounding box tool 240, as shown on the display screen 230 via dashed lines to a GUI interface for the firmware/software system 220.

Figure 3:
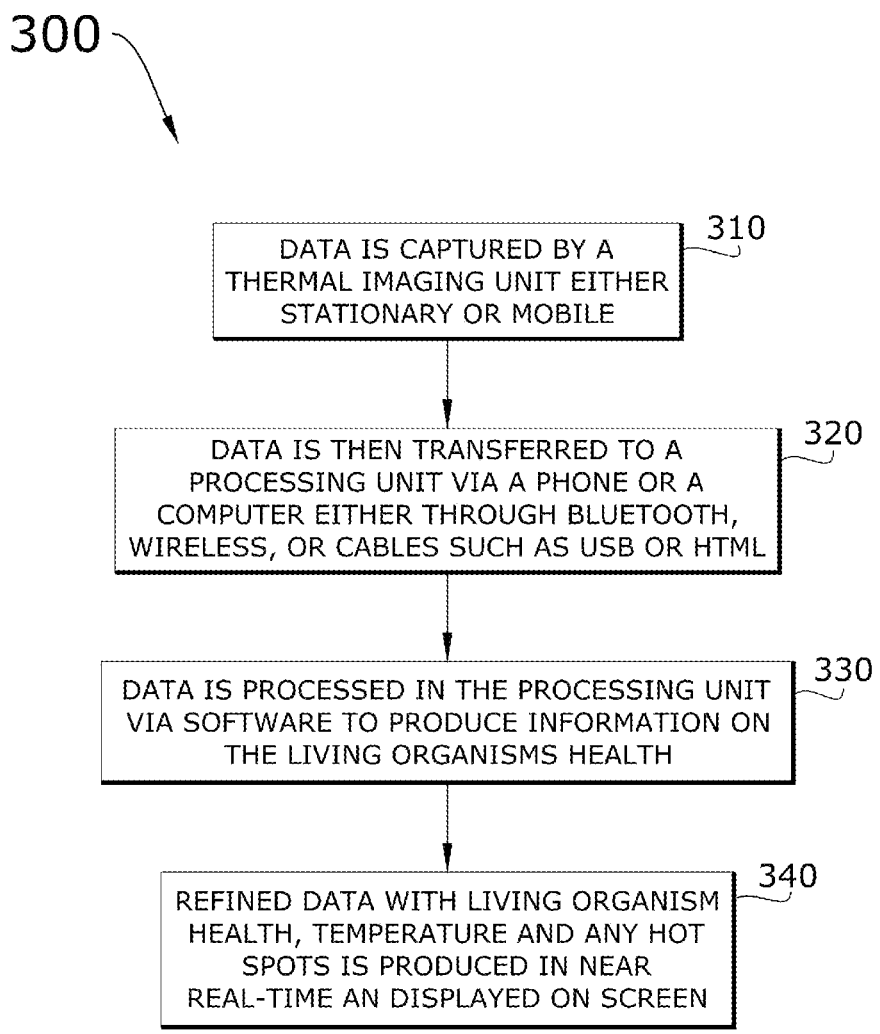
FIG. 3 conceptually illustrates a livestock, wildlife, and domesticated animal automated temperature screening process in some embodiments for monitoring health and wellbeing of animals including livestock, domesticated animals, and wildlife in some embodiments.

By way of a different example, FIG. 3 conceptually illustrates a livestock, wildlife, and domesticated animal automated temperature screening process 300 for monitoring health and wellbeing of animals including livestock, domesticated animals, and wildlife in some embodiments. As shown in this figure, the livestock, wildlife, and domesticated animal automated temperature screening process 300 starts with data that is captured (at 310) by a thermal imaging unit (or thermal camera) either as a stationary (or mounted) unit or mobile unit. Next, the livestock, wildlife, and domesticated animal automated temperature screening process 300 proceeds to a step at which the data is transferred (or transmitted via wired or wireless transmission) to the processing unit (at 320). The data may be transmitted via phone or other mobile device, or computing device, or by customer PCB integrated within or connected to the thermal imaging unit. The data transmission may be wireless, such as Bluetooth transmission or WiFi transmission, or wired, such as Ethernet cables, USB cables, and transmitted in a common format, such as HTML or other common format for video, thermal data, etc.

After the data is transmitted to the processing unit, the livestock, wildlife, and domesticated animal automated temperature screening process 300 of some embodiments then continues to the next step at which the processing unit processes the data (at 330) via the firmware/software to analyze animal health and wellbeing. In some embodiments, the processing unit also produces information on the animal/living organism's health for visual output on a screen that is communicably connected to the processing unit. In some embodiments, the thermal imaging data the information produced by the processing unit are persistently stored in a storage device for post-processing activities and/or as a backup of the data. Finally, the livestock, wildlife, and domesticated animal automated temperature screening process 300 proceeds ahead to a step at which the refined data from the processing unit with the animal/living organism's health, temperature, any detected/identified hot spots, and other information is produced and visually output onto the screen in realtime (when screen is included on the processing unit) or stored for post-processing (at 340). The visual output of the data for an exemplary animal is described next, by reference to FIG. 4.

Figure 4:
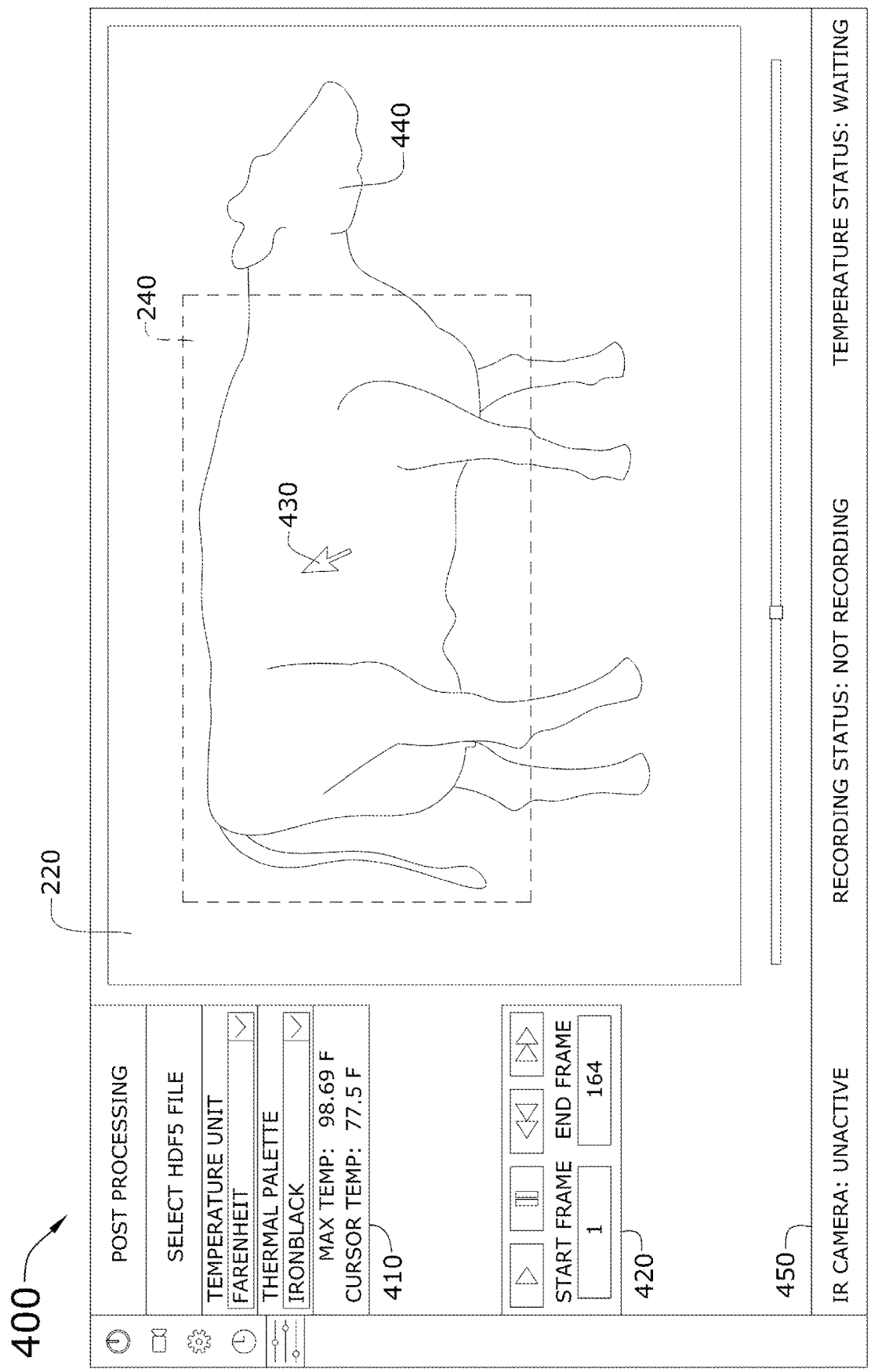
FIG. 4 conceptually illustrates a graphical user interface (GUI) of an animal health and wellbeing detection and pinpoint identification software application that is used in connection with the livestock, wildlife, and domesticated animal automated temperature screening system of some embodiments to accurately pinpoint the location at which the elevated temperature is present on the animal and pinpoint the exact animal needing screening.

Specifically, FIG. 4 conceptually illustrates a graphical user interface (GUI) of an animal health and wellbeing detection and pinpoint identification software application 400 that is used in connection with the livestock, wildlife, and domesticated animal automated temperature screening system of some embodiments to accurately pinpoint the location at which the elevated temperature is present on the animal and pinpoint the exact animal needing screening. The animal health and wellbeing detection and pinpoint identification software application 400 in this figure is an example of the firmware/software with GUI interface software working in combination for a user to interact with in realtime. As shown in this figure, the GUI of the animal health and wellbeing detection and pinpoint identification software application 400 includes a plurality of settings and tool-focused temperature readings 410, a plurality of video playback tools 420, a cursor pinpoint tool 430, a subject animal image 440 which is displayed by the firmware/software system 220 after the data is received from the thermal camera and cleansed by way of the bounding box tool 240 to eliminate any extraneous elements in the view, and a system and devices status bar 450 that provides realtime status of IR sensors/cameras (if any), a temperature status for the subject animal 440 (in this example with status "waiting"), and a recording status of the thermal camera (in this case "not recording" as this would appear to be a pause of the video by the user through the video playback tools 420 or a view of a post-processing stored video of data captured previously by the thermal camera). Thus, by interacting with the GUI of the animal health and wellbeing detection and pinpoint identification software application 400, the user is able to view animal health and wellbeing for one or many animals, livestock, wildlife, domesticated animal, or any other living organism that produces varying levels of temperature as a consequence of health for the organism.

While referring almost entirely to living animals or organisms, it is noted here that the livestock, wildlife, and domesticated animal automated temperature screening system and process can be adapted for use in assessing mechanical or other non-living organisms and machines that could have the health of the object or component accessed by the heat of the object only with the accuracy in which an adjusted threshold, steady state, and bounding box is needed to accurately access and detect the component in question.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash storage (such as USB flash drives or SD flash memory modules), RAM chips, hard drives (including solid state storage devices "SSD"), EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 5:
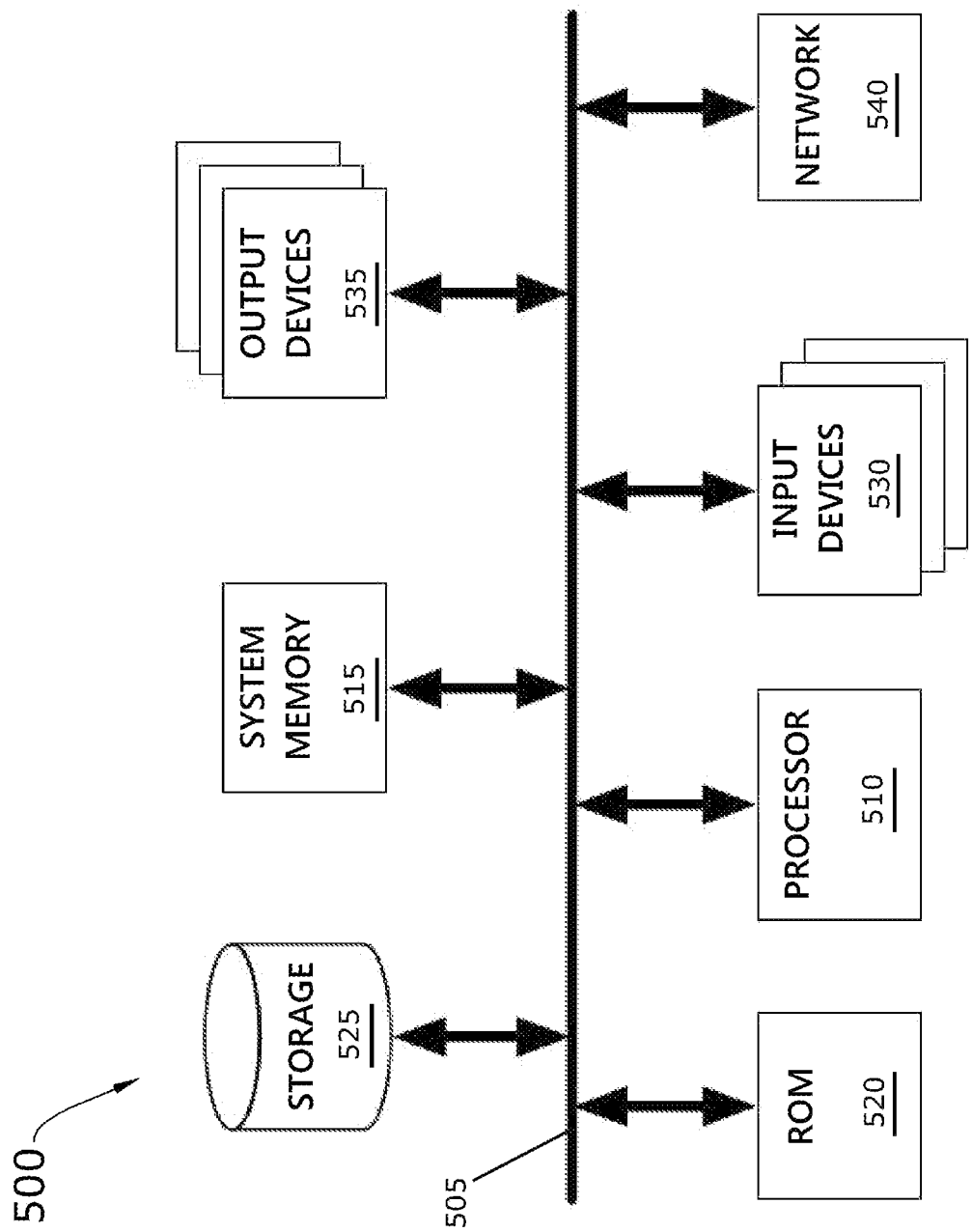
FIG. 5 conceptually illustrates an electronic system with which some embodiments of the invention are implemented.

FIG. 5 conceptually illustrates an electronic system 500 with which some embodiments of the invention are implemented. The electronic system 500 may be a computer, phone (cell phone, mobile phone, smartphone, etc.), PDA (digital assistant device, etc.), tablet computing device, smart camera, or any other sort of electronic device or computing device. Such an electronic system includes various types of computer readable media and interfaces for various other types of computer readable media. Electronic system 500 includes a bus 505, processing unit(s) 510, a system memory 515, a read-only memory 520, a permanent storage device 525, input devices 530, output devices 535, and a network 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525.

From these various memory units, the processing unit(s) 510 retrieves instructions to execute and data to process in order to execute the processes of the invention. The processing unit(s) may be a single processor or a multi-core processor in different embodiments.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some embodiments of the invention use a mass-storage device (such as a magnetic or optical disk and its corresponding disk drive) as the permanent storage device 525.

Other embodiments use a removable storage device (such as a floppy disk or a flash drive) as the permanent storage device 525. Like the permanent storage device 525, the system memory 515 is a read-and-write memory device. However, unlike storage device 525, the system memory 515 is a volatile read-and-write memory, such as a random access memory. The system memory 515 stores some of the instructions and data that the processor needs at runtime. In some embodiments, the invention's processes are stored in the system memory 515, the permanent storage device 525, and/or the read-only memory 520. For example, the various memory units include instructions for processing appearance alterations of animal temperature. From these various memory units, the processing unit(s) 510 retrieves instructions to execute and data to process in order to execute the processes of some embodiments.

The bus 505 also connects to the input and output devices 530 and 535. The input devices enable the user to communicate information and select commands to the electronic system. The input devices 530 include alphanumeric keyboards and pointing devices (also called "cursor control devices"). The output devices 535 display images generated by the electronic system 500. The output devices 535 include printers and display devices, such as liquid crystal displays (LCD) or organic light emitting diode (OLED) displays. Some embodiments include devices such as a touchscreen that functions as both input and output devices.

Finally, as shown in FIG. 5, bus 505 also couples electronic system 500 to a network 540 through a network adapter (not shown). In this manner, the computer can be a part of a network of computers (such as a local area network ("LAN"), a wide area network ("WAN"), or an intranet), or a network of networks (such as the Internet). Any or all components of electronic system 500 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General purpose and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, machine-readable storage media, or simply as media). The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A livestock, wildlife, and domesticated animal automated temperature screening system to monitor health and well being of animals including livestock, domesticated animals, and wildlife comprising:
   a thermal imaging system comprising a thermal image data communications device and only one camera, wherein the one camera comprises a thermal camera that is configured to capture thermal imaging data of animals passing in front of a field of view of the thermal camera;
   a processing unit of a computing device that is communicably connected to the thermal imaging system and is configured to receive the thermal imaging data from the thermal imaging system and load the thermal imaging data for processing; and
   an animal health and wellbeing detection and pinpoint identification software system that is installed on the computing device and runs on the processing unit, wherein the animal health and wellbeing detection and pinpoint identification software system is configured to analyze the thermal imaging data when loaded by the processing unit for processing, cleanse the thermal imaging data by processing the thermal imaging data to remove anomalies and false readings from the thermal imaging data, detect each subject animal in the cleansed thermal imaging data to distinguish from extraneous elements in the cleansed thermal imaging data, and analyze the thermal imaging data to obtain temperature for each subject animal, wherein the animal health and wellbeing detection and pinpoint identification software system is further configured to identify precise areas of each subject animal with elevated temperature beyond a threshold numeric value.

2. The livestock, wildlife, and domesticated animal automated temperature screening system of claim 1, wherein the thermal image data communications device comprises one of (i) a wired communications interface configured to transfer the thermal image data over a data cable to the processing unit and (ii) a wireless communication interface configured to wirelessly transfer the image data over to the processing unit via one of WiFi® and Bluetooth®.

3. The livestock, wildlife, and domesticated animal automated temperature screening system of claim 1, wherein the thermal camera comprises an infrared (IR) sensor.

4. The livestock, wildlife, and domesticated animal automated temperature screening system of claim 1, wherein the animal health and wellbeing detection and pinpoint identification software system comprises a steady state program that implements a steady state algorithm that averages temperature of animals and surrounding objects, wherein the steady state program is configured to accurately read animal temperature by detecting and excluding anomalies and false readings from the thermal imaging data and to provide adjusted animal temperature readings that accurately gauge animal health and well being.

5. The livestock, wildlife, and domesticated animal automated temperature screening system of claim 1, wherein the animal health and wellbeing detection and pinpoint identification software system comprises an implicit bounding box control, wherein the animal health and wellbeing detection and pinpoint identification software system detects each subject animal in the cleansed thermal imaging data by utilizing the implicit bounding box control to automatically identify each subject animal passing in front of the field of view of the thermal camera, wherein the animal health and wellbeing detection and pinpoint identification software system distinguishes the subject animal from extraneous elements by excluding other extraneous animals, organisms, and objects remaining in the cleansed thermal imaging data.

6. The livestock, wildlife, and domesticated animal automated temperature screening system of claim 5, wherein the animal health and wellbeing detection and pinpoint identification software system comprises a pinpoint accuracy control that is configured to detect and identify elevated temperature in precise areas and parts of each subject animal in need of accurate assessment of temperature, wherein the animal health and wellbeing detection and pinpoint identification software system uses the pinpoint accuracy control for each detected and identified subject animal to identify the precise areas of the detected and identified subject animal with elevated temperature beyond the threshold numeric value.

7. The livestock, wildlife, and domesticated animal automated temperature screening system of claim 1, wherein the computing device comprises a display screen.

8. The livestock, wildlife, and domesticated animal automated temperature screening system of claim 7, wherein the animal health and wellbeing detection and pinpoint identification software system comprises a graphical user interface (GUI), a bounding box GUI tool, and a cursor pinpoint GUI tool, wherein the GUI is visually output onto the display screen and configured to display thermal imaging data of the animals passing in front of a field of view of the thermal camera in realtime for review by a user and to receive user interaction from the user to activate one or more of the bounding box GUI tool and the cursor pinpoint GUI tool.

9. The livestock, wildlife, and domesticated animal automated temperature screening system of claim 5, wherein the animal health and wellbeing detection and pinpoint identification software system comprises an alert notification system that is configured to automatically generate and send a communication to a user that notifies the user of a specific animal with a temperature reading that exceeds the threshold numeric value.

10. The livestock, wildlife, and domesticated animal automated temperature screening system of claim 9, wherein the communication generated and sent by the alert notification system comprises one of an email message, an email message with an image attachment, a text message (SMS), a text message with image attachment (MMS), and an automated voice message.

11. The livestock, wildlife, and domesticated animal automated temperature screening system of claim 1, wherein the thermal camera comprises a thermal imaging module with an integrated lens.

12. The livestock, wildlife, and domesticated animal automated temperature screening system of claim 1, wherein the thermal camera comprises an integrated thermal sensor.

13. The livestock, wildlife, and domesticated animal automated temperature screening system of claim 12, wherein the integrated thermal sensor comprises an integrated infrared (IR) sensor.

14. A livestock, wildlife, and domesticated animal automated temperature screening system to monitor health and well being of animals including livestock, domesticated animals, and wildlife comprising:

a thermal imaging system comprising a digital video camera and an infrared (IR) sensor integrated into the digital video camera, wherein the thermal imaging system is configured to capture video sequences of thermal imaging data of animals passing in front of a field of view of the digital video camera and the IR sensor integrated into the digital video camera;

a processing unit of a computing device that is communicably connected to the thermal imaging system and is configured to receive the video sequences of thermal imaging data from the thermal imaging system and load the video sequences of thermal imaging data for processing; and an animal health and wellbeing detection and pinpoint identification software system that is installed on the computing device and runs on the processing unit, wherein the animal health and wellbeing detection and pinpoint identification software system is configured to analyze the each video sequence of thermal imaging data when loaded by the processing unit for processing, cleanse the video sequence of thermal imaging data by processing each thermal imaging data video frame of a plurality of thermal imaging data video frames in the video sequence of thermal imaging data to remove anomalies and false readings from the thermal imaging data video frame, detect each subject animal in the cleansed thermal imaging data video frame to distinguish from extraneous elements in the cleansed thermal imaging data video frame, and analyze the thermal imaging data video frame to obtain temperature for the detected subject animal, wherein the animal health and wellbeing detection and pinpoint identification software system is further configured to identify precise areas of each subject animal with elevated temperature beyond a threshold numeric value.

15. A livestock, wildlife, and domesticated animal automated temperature screening system to monitor health and well being of animals including livestock, domesticated animals, and wildlife comprising:

a thermal imaging system comprising a digital camera, wherein the thermal imaging system is configured to capture imaging data in a visible light spectrum of animals passing in front of a field of view of the digital camera;

a processing unit of a computing device that is communicably connected to the thermal imaging system and is configured to receive the imaging data in the visible light spectrum from the thermal imaging system, convert the imaging data to thermal imaging data, load the thermal imaging data for processing, and generate a thermal imaging data video as a time-ordered image sequence of the thermal imaging data;

a memory storage of the computing device that is configured to store the thermal imaging data video after the processing unit converts the imaging data to the thermal imaging data and generates the thermal imaging data video;

a display screen communicably connected to the computing device; and an animal health and wellbeing detection and pinpoint identification software system that is installed on the computing device and runs on the processing unit, wherein the animal health and wellbeing detection and pinpoint identification software system comprises a graphical user interface (GUI) and a plurality of video playback tools, wherein the animal health and wellbeing detection and pinpoint identification software system is configured to analyze the thermal imaging data when loaded by the processing unit for processing, cleanse the thermal imaging data by processing the thermal imaging data to remove anomalies and false readings from the thermal imaging data, detect each subject animal in the cleansed thermal imaging data to distinguish from extraneous elements in the cleansed thermal imaging data, and analyze the thermal imaging data to obtain temperature for each subject animal, wherein the animal health and wellbeing detection and pinpoint identification software system is further configured to identify precise areas of each subject animal with elevated temperature beyond a threshold numeric value, wherein the animal health and wellbeing detection and pinpoint identification software system is further configured to visually output the GUI and the plurality of video playback tools on the display screen, wherein the plurality of video playback tools are configured for playback of the thermal imaging data video stored in the memory storage of the computing device.

\* \* \* \* \*